(12) United States Patent
Wynn et al.

(10) Patent No.: US 11,090,831 B2
(45) Date of Patent: Aug. 17, 2021

(54) SLASHER SAW SYSTEM

(71) Applicants: James F. Wynn, Keystone Heights, FL (US); Brian J. Wynn, Starke, FL (US)

(72) Inventors: James F. Wynn, Keystone Heights, FL (US); Brian J. Wynn, Starke, FL (US)

(*) Notice: Subject to any disclaimer, the term of this patent is extended or adjusted under 35 U.S.C. 154(b) by 0 days.

(21) Appl. No.: 16/412,405

(22) Filed: May 14, 2019

(65) Prior Publication Data

US 2020/0282587 A1    Sep. 10, 2020

Related U.S. Application Data

(60) Provisional application No. 62/816,100, filed on Mar. 9, 2019.

(51) Int. Cl.
     *B27B 5/29*      (2006.01)
     *B27B 1/00*      (2006.01)
     *B27B 5/18*      (2006.01)

(52) U.S. Cl.
     CPC ............... *B27B 5/29* (2013.01); *B27B 1/002* (2013.01); *B27B 5/185* (2013.01)

(58) Field of Classification Search
     CPC .......... B27B 5/29; B27B 5/185; B27B 1/002; B27B 17/0083; B27B 17/08; A01G 23/08; A01G 23/085; A01G 23/091; A01G 23/093; A01G 23/095
     USPC ....... 144/336, 34.1, 356; 83/469–508.3, 160, 83/368, 425.2, 436.9, 471.1, 75.5, 76.8
     See application file for complete search history.

(56) References Cited

U.S. PATENT DOCUMENTS

| | | | | |
|---|---|---|---|---|
| 2,795,933 | A * | 6/1957 | McCallum | B27B 17/00 173/8 |
| 3,625,102 | A * | 12/1971 | Shino | B23D 47/04 83/460 |
| 3,832,928 | A * | 9/1974 | Copeland | B27B 5/02 83/468.2 |
| 4,431,064 | A * | 2/1984 | Bright | E21B 44/005 175/93 |
| 4,722,258 | A * | 2/1988 | Johnson | B27B 17/0058 83/639.2 |
| 7,451,790 | B2 * | 11/2008 | Vallebrant | B27B 17/08 144/34.1 |
| 2014/0027019 | A1 * | 1/2014 | Ketonen | A01G 23/091 144/336 |

\* cited by examiner

*Primary Examiner* — Stephen Choi
*Assistant Examiner* — Nhat Chieu Q Do
(74) *Attorney, Agent, or Firm* — Steven R. Scott (57) ABSTRACT

A slasher saw system connectable to a source of hydraulic power which requires hydraulic lines for power and operation. First, a pressure/power hydraulic line is actuated to turn the saw on and bring the saw down to cut through a stack of timber. Second, the hydraulic pressure/power to bring the saw down is actually provided via back-pressure from a return line returning hydraulic fluid to the source of hydraulic power from the saw. Third, a separate line is used to power the hydraulic cylinder used to raise the saw arm again. Fourth, a separate line including a one-way fluid valve allowing hydraulic fluid flow only from the hydraulic fluid output of the saw blade motor to the hydraulic fluid input for the saw blade motor.

16 Claims, 10 Drawing Sheets

SLASHER SAW SYSTEM

CROSS-REFERENCE TO RELATED APPLICATIONS

This application claims the benefit and priority of U.S. Provisional Application Ser. No. 62/816,100 titled "Improved Slasher Saw System" filed Mar. 9, 2019, the same being incorporated herein by reference.

BACKGROUND OF THE INVENTION

Field of the Invention

The instant invention pertains generally to circular slasher saws used for processing felled timber in the field into appropriate lengths for loading and transport. More particularly, the instant invention is directed to an improved hydraulic power and operating system for such saws that allows the efficient operation of the circular saw in conjunction with a lower powered and less expensive source of hydraulic power and otherwise improves on prior art systems.

Relevant Art

Slasher saws have long been used in conjunction with loaders in the field for the processing of felled timber into transportable lengths. The loader is a crane-like item of heavy equipment having a cab for the operator and providing hydraulic power both for its own operation and for the operation of a separate Slasher saw assembly. The operator of the loader controls the loader's hydraulically powered loader arm, which is adapted for movement of stacks (or individual stems) of felled trees for placement into the cradle of the slasher saw assembly, where they are cut into appropriate lengths by the slasher saw (which is also controlled by the loader operator).

Slasher saws are typically of two types: bar saws and circular saws. A bar saw operates with a chainsaw type saw bar. It runs off of three hydraulic lines: (1) a 1" pressure/power line (which is actuated to turn the saw on and bring the bar saw down to cut through a stack of timber); (2) a 1" return line returning hydraulic fluid to the loader from (1); and (3) a ½" line to power the hydraulic cylinder used to raise the bar saw arm. The log loader used in conjunction with a bar saw comes with a bar saw power package adapted for the requirements of this type of saw assembly, which requires less power than current circular saw assemblies and is currently around $15,000 less expensive than the power package required for operation of a circular saw. However, if uses two gallons of bar and chain oil daily, the chain must be sharpened weekly, the bar wears out within a year, and the bar and chain must be brought down on the wood piled beneath it two to three times to cut through a trough of wood in the cradle of a slasher saw assembly. Thus, even though requiring less power and less expensive, bar saws are more expensive to operate, require more maintenance, are less durable, and less efficient to operate.

A standard prior art slasher saw assembly using a circular saw requires five hydraulic lines: (1) a 1" pressure/power line (which is actuated to turn the saw); (2) a 1" return line returning hydraulic fluid to the loader from (1); (3) a ⅝ inch case drain line from the motor; (4) a ½" line to power/fill the side of the hydraulic cylinder used to raise the circular saw arm; and (5) a ½" line to power/fill the side of the hydraulic cylinder used to lower the circular saw arm. The log loader used in conjunction with a prior art circular saw comes with a circular saw power package adapted for the requirements of this type of saw assembly, which requires more power than bar saw assemblies so as to require an upgrade making it approximately $15,000 more expensive than the power package required for operation of a bar saw. Also, it uses a half gallon of additional fuel per hour. However, it has distinctive advantages over the bar saw in that the blade teeth used last up to a year and are easily replaced, and it is capable of sawing through an entire trough of wood instead of requiring two to three attempts to finish the job.

SUMMARY OF THE INVENTION

The instant invention combines the best features of the two previous types of saws (and loader saw packages). Like the bar saw, it requires only three hydraulic lines from the loader for power and operation, but splits these into four lines at the slasher saw end to accomplish its purposes: (1) a 1" pressure/power "input" hydraulic line from loader to slasher saw motor (which is actuated to turn the saw on); (2) a 1" "return output" line returning hydraulic fluid to the loader from the slasher saw motor; (3) a ½" "raise" line to power the hydraulic cylinder used to raise the saw arm; and (4) a ½" "lower" line branching off of output line (2) to bring the bar saw down to cut through a stack of timber. This means that it can be driven using a standard bar saw package, saving (at current prices) approximately $15,000 up front, able to saw through a trough of wood in a single stroke, having blade teeth that last up to a year and are easily replaced, and otherwise avoiding the maintenance and durability problems associated with bar saws while possessing the durability and ease of use of prior art circular saws.

These and other aspects of the inventive concept and goals can best be understood by reference the drawing figures and description that follow.

BRIEF DESCRIPTION OF THE DRAWINGS

The novel features believed to be characteristic of this invention are set forth with particularity in the appended claims. The invention itself, however, both as to its organization and method of operation, together with further object and advantages thereof, may best be understood by reference to the following description taken in connection with the accompanying drawings in which:

DESCRIPTION

Figure 1A:
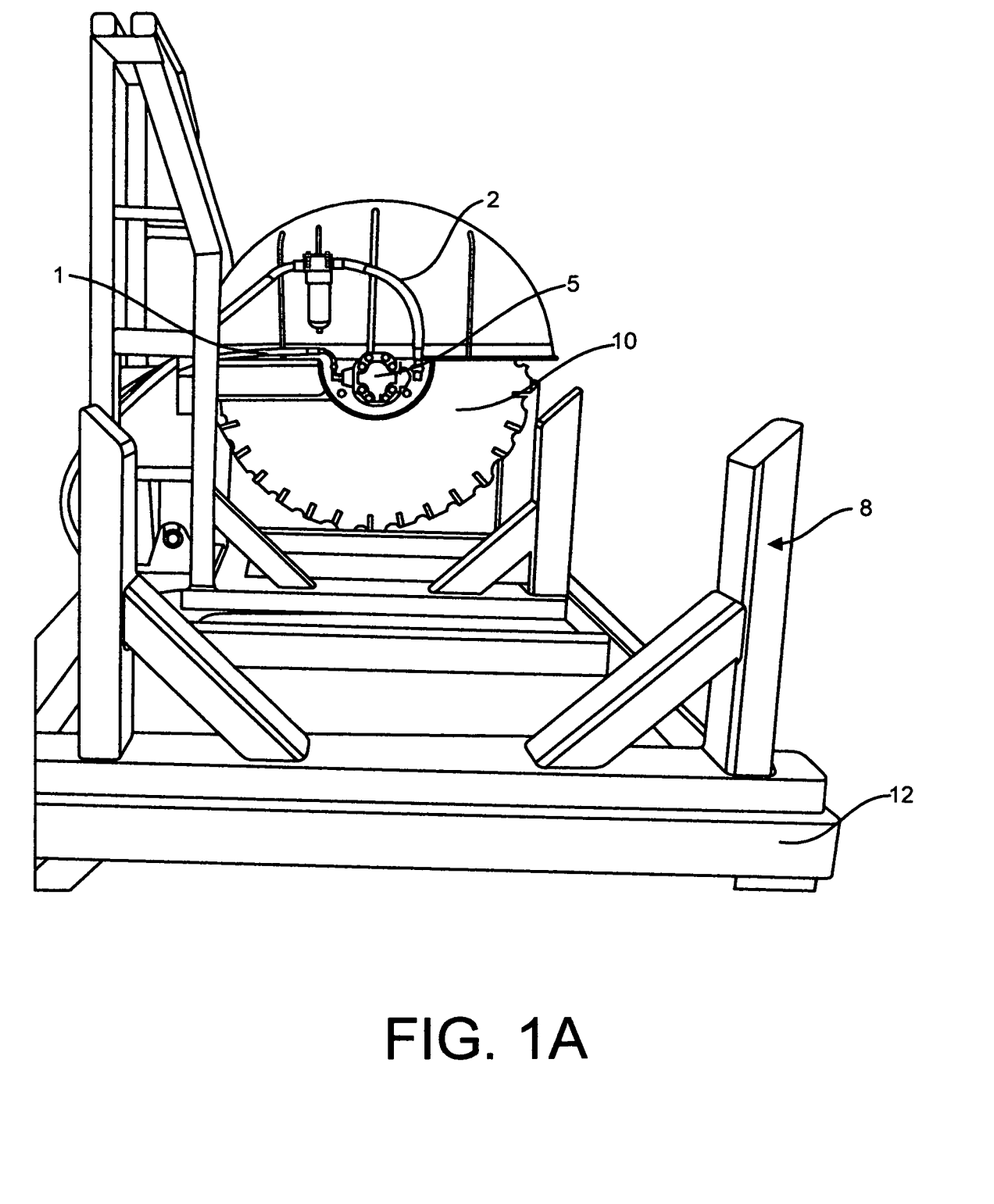
FIG. 1A provides a perspective view of a circular slasher saw system from the trough/cradle end of the assembly/frame.
Figure 1B:
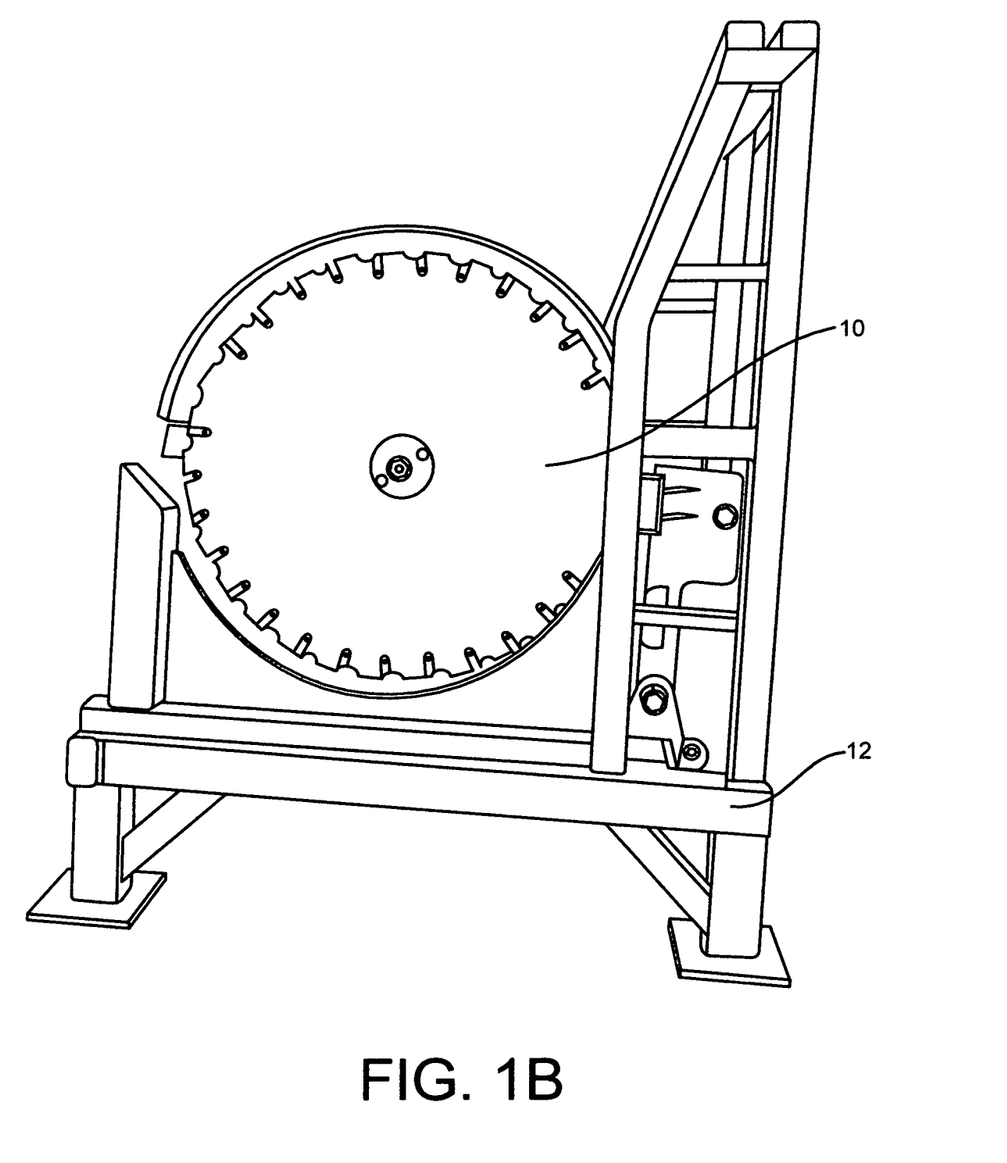
FIG. 1B provides a perspective view of a circular slasher saw system from the end opposite the trough/cradle of the assembly/frame.
Figure 1C:
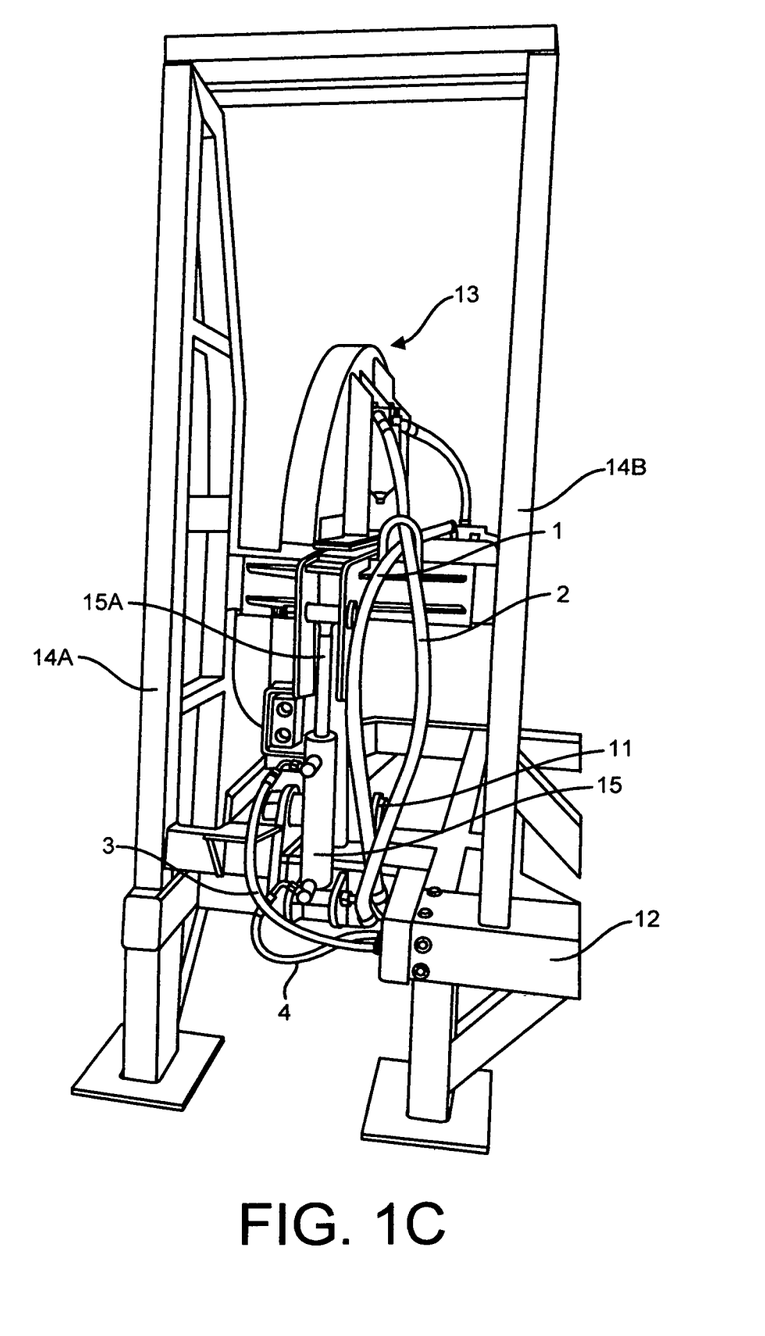
FIG. 1C provides a perspective view from the back side of the circular saw assembly of the prior slasher saw system.

FIGS. 1A through 1C, provide illustrations of a circular saw assembly for generic purposes in detailing features common to both the current invention and prior art circular saw assemblies. As will be seen by review of FIG. 1C, the circular saw 10 is mounted via a pivot 11 to frame 12, so as to be rotatable around pivot 11. This allows circular saw 10 to be pivoted upward into "the pocket" 13 formed by and between frame uprights 14A, 14B in response to the movement downward of piston arm 15A shown extending from hydraulic cylinder 15. Likewise, movement upward of piston arm 15A will bring circular saw 10 down to the position shown in FIGS. 1A-1C. Operationally, saw 10 is caused to turn via the flow of hydraulic fluid through a pressure/power hose (motor power hose 1), which hydraulic fluid powers saw motor 5 and returns to the pump on its associated loader (not shown) via motor return hose 2. From there, it continues to cycle through (and power) saw 10 via saw motor 5 as long as the pump is actuated. Likewise, it will be seen that there is a hydraulic fluid line (up/raise hose 3) to power/fill the side of the hydraulic cylinder used to raise the circular saw 10 and one (down/lower hose 4) to power/fill the side of the hydraulic cylinder 15 used to lower the circular saw 10.

Figure 2A:
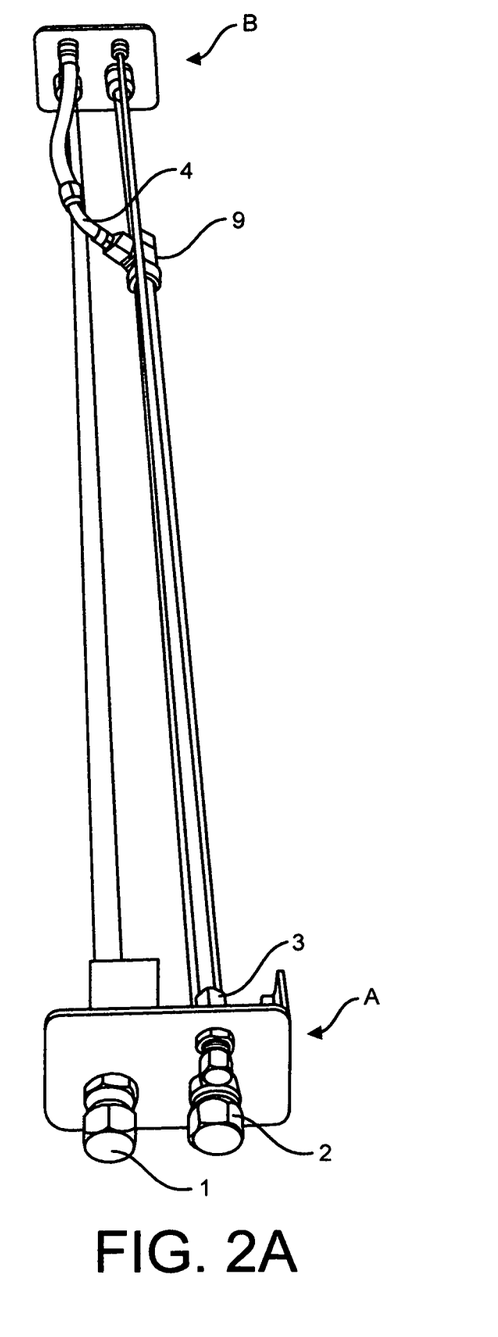
FIG. 2A provides perspective view of the hydraulic power lines for the circular saw assembly of the invention from the loader end.
Figure 2B:
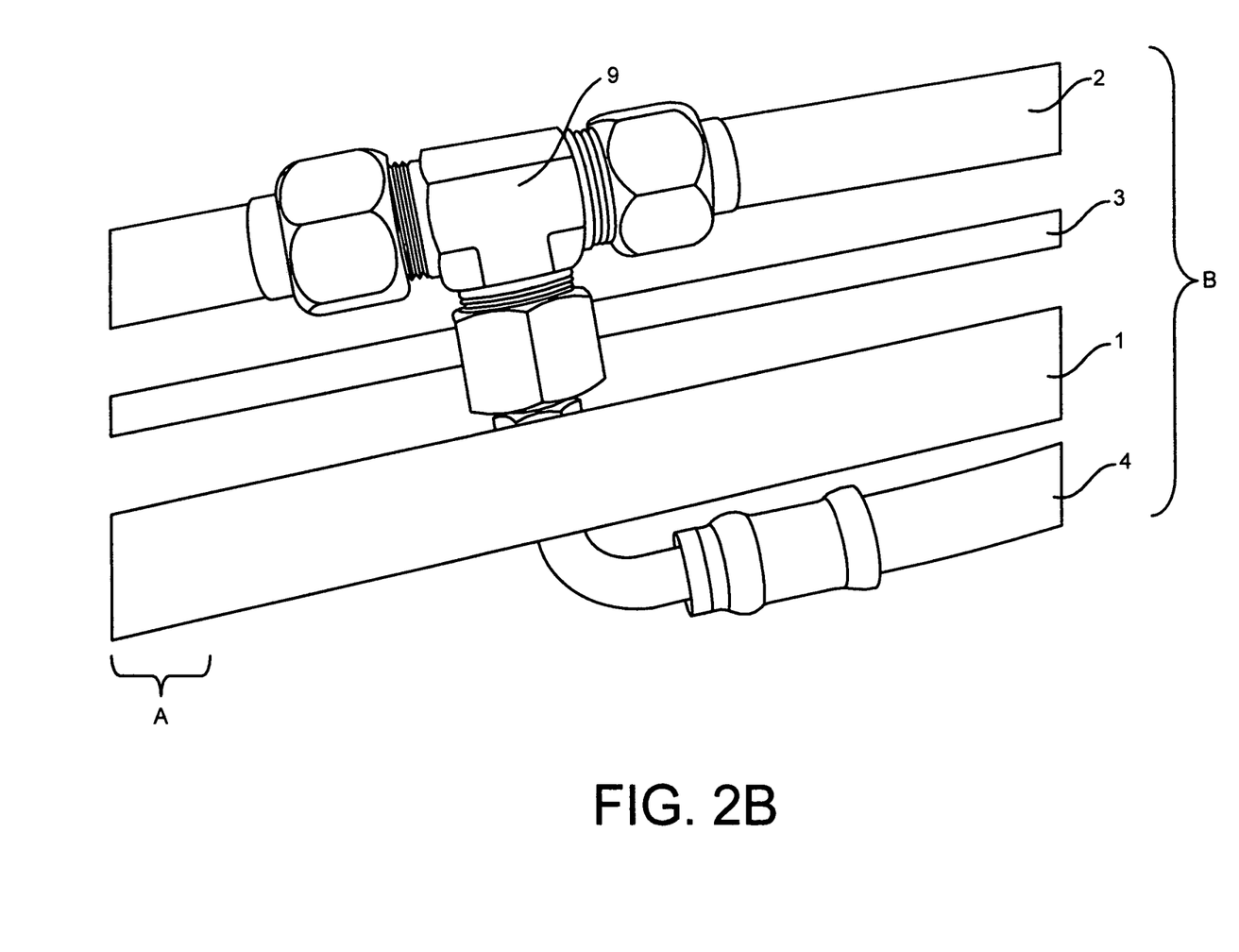
FIG. 2B provides a perspective view of the hydraulic power lines for the circular saw assembly of the invention from the saw and lift cylinder end.
Figure 2C:
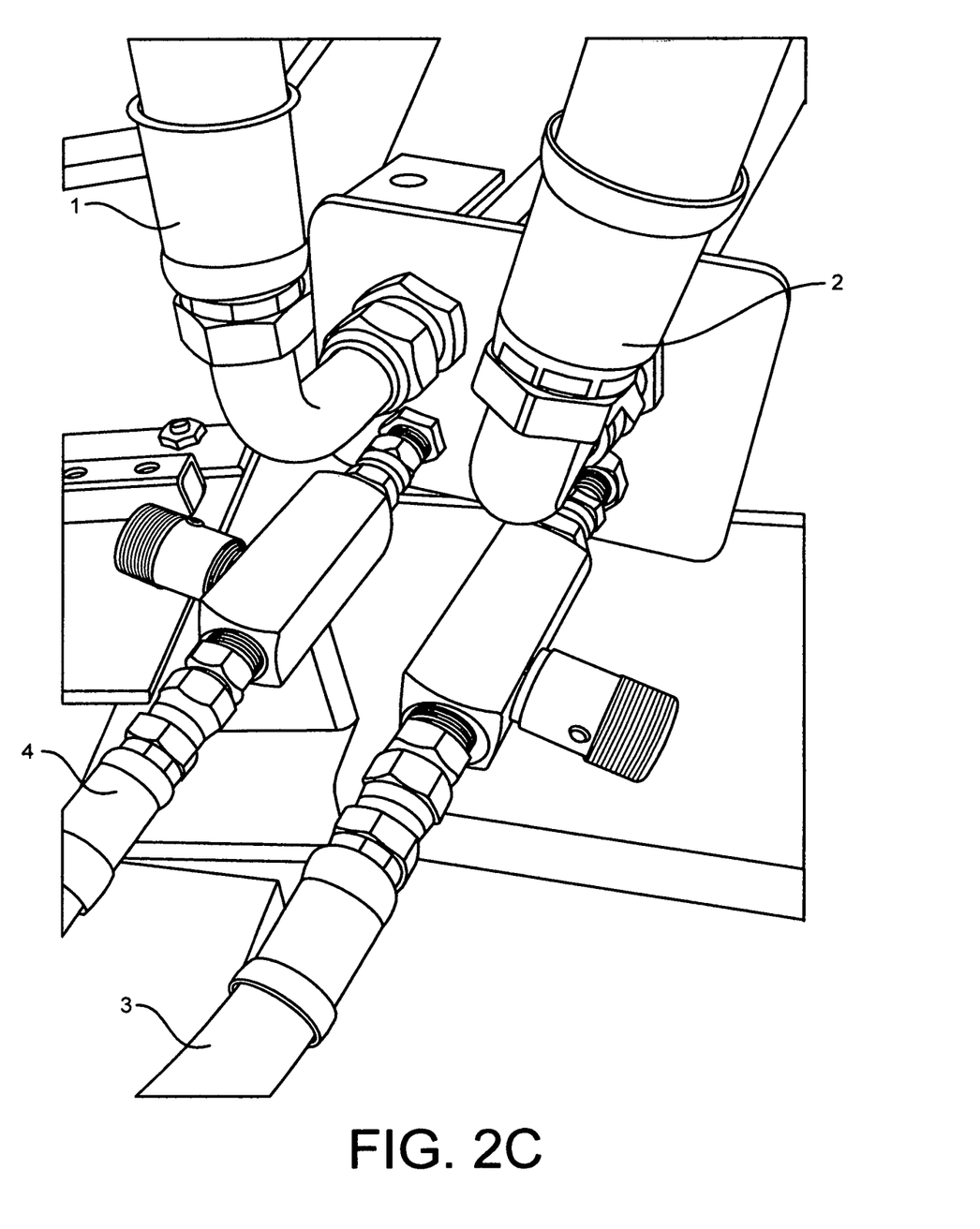
FIG. 2C provides a detailed perspective view of the "T" in the hydraulic power lines used to create four hydraulic lines for the circular saw assembly of the invention from the saw and lift cylinder end.
Figure 3A:
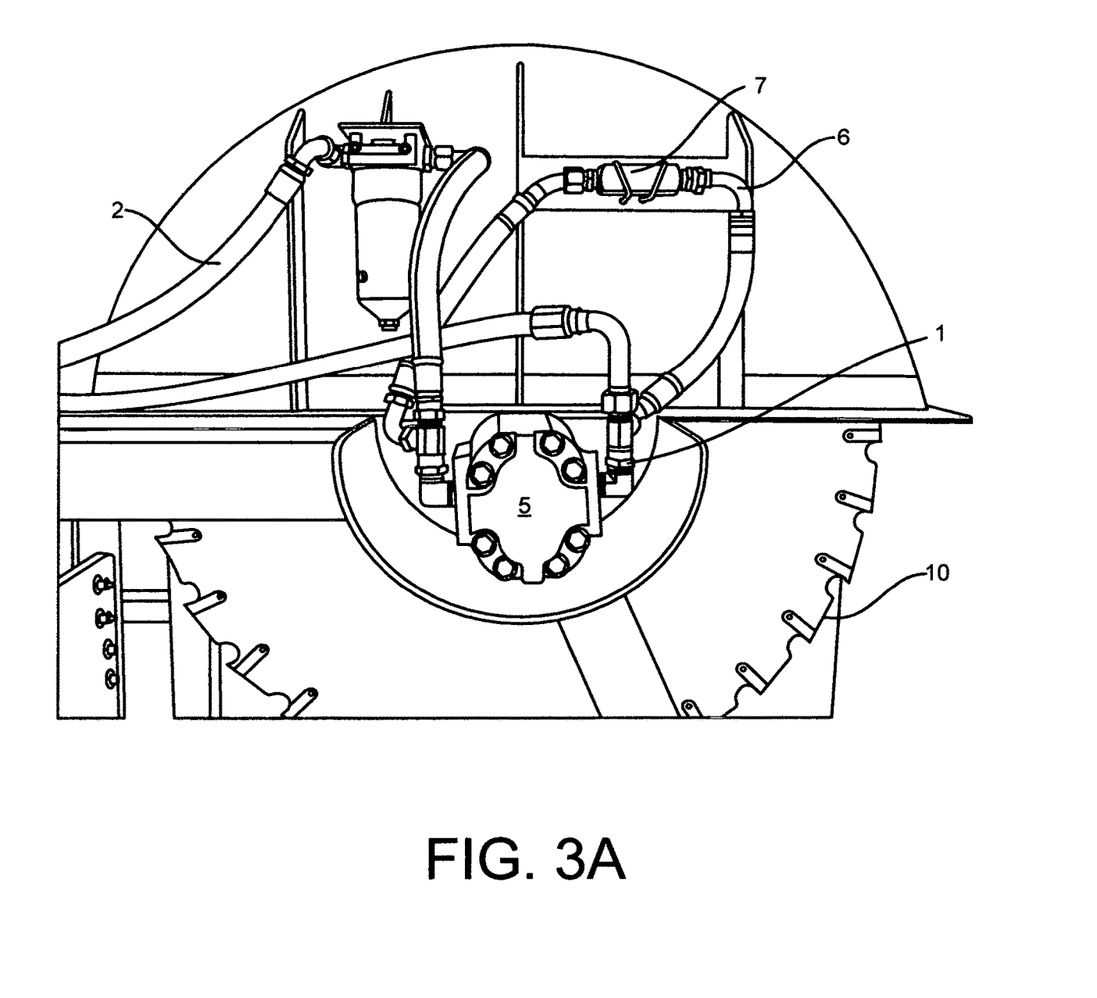
FIG. 3A provides a detailed perspective view of the arrangement of hydraulic hoses powering the circular saw.

To this point, in terms of the numbered and described parts above, the slasher saw assembly of the invention resembles prior art slasher saw assemblies. However, as best seen in FIGS. 2A-2C, initial differences can best be seen in the nature of the hydraulic power lines/hoses 1, 2, 3, 4 that run inside the frame 12 of the invention and serve to convey hydraulic power/fluid from the loader to the saw 10 and hydraulic cylinder 15 and back to the loader. In prior art circular slasher saw assemblies, there is a power line/hose from the loader to the motor and a return line/hose from the motor to the loader. Likewise, in prior art circular saw assemblies, there is a lift line/hose from the loader to the cylinder and another line/hose from the loader to the cylinder to lower the saw. Thus, there is a total of two separate lines used to power/operate the saw, and two separate lines used to power/operate the hydraulic cylinder. Likewise, with bar saw assemblies, there are only three lines running from the loader to the motor/cylinder. There is one line from loader to slasher assembly to power the saw and bring it down, and a return line from slasher assembly to loader. And, there is one line to fill the up/raise side of the hydraulic cylinder. However, in the instant invention, there are three lines running from the loader that split to become four lines at the slasher saw assembly. The four lines/hoses at the saw assembly end "B" are saw power hose/line 1, saw return hose/line 2, saw raise hose/line 3, and saw lower hose/line 4. The three hoses/lines at the loader end "A" are saw power hose/line 1, saw return hose/line 2, saw raise hose/line 3. The fourth line/hose (saw lower hose/line 4) is provided via a "T", juncture 9 in motor return line 2. In our invention, there is also a 1" recirculation line 6 between motor 5 hydraulic fluid input via line 1 and hydraulic fluid output via line 2 with a check valve 7 allowing flow only from the output end to the input end. Further, the end of 1" return line 2 at the loader end A is restricted by an orifice or flow control in the return line 2, which can be placed anywhere between the "T" junction 9 and the loader itself. In addition, the motor 5 of my invention uses a more durable gear driven motor rather than the normal piston pumper motor used on other circular slasher saws. (See, FIG. 3A).

The foregoing factors create a circular saw system that functions on the lower powered, less expensive power package normally used with a bar saw. For operational purposes only two buttons (or activation switches) on the loader are necessary. A first button/switch on the loader controls (not shown) that sends fluid to the "up" side of cylinder 15 via line 3, which has a narrowed orifice or flow control 16A between the hydraulic cylinder 15 and the loader. (This orifice or flow control 16A acts as a flow restrictor and makes the saw 10 come back into the "pocket", 13 smoothly). A second button/switch on the loader controls (not shown) sends fluid through power line 1 to bring saw 5 up to speed for cutting and after a brief pause for back-pressure to build in line 2 (caused by a flow restricting orifice or flow control 16B between the "T" junction 9 and the loader) forcing fluid into and through line 4 to the "down" side of cylinder 15, which has an orifice or flow control 16C between the hydraulic cylinder 15 and the "T" junction 9. (This flow restricting orifice or flow control 16C makes the saw 10 go down at the right speed to cut through the load of wood in cradle 8).

Figure 3B:
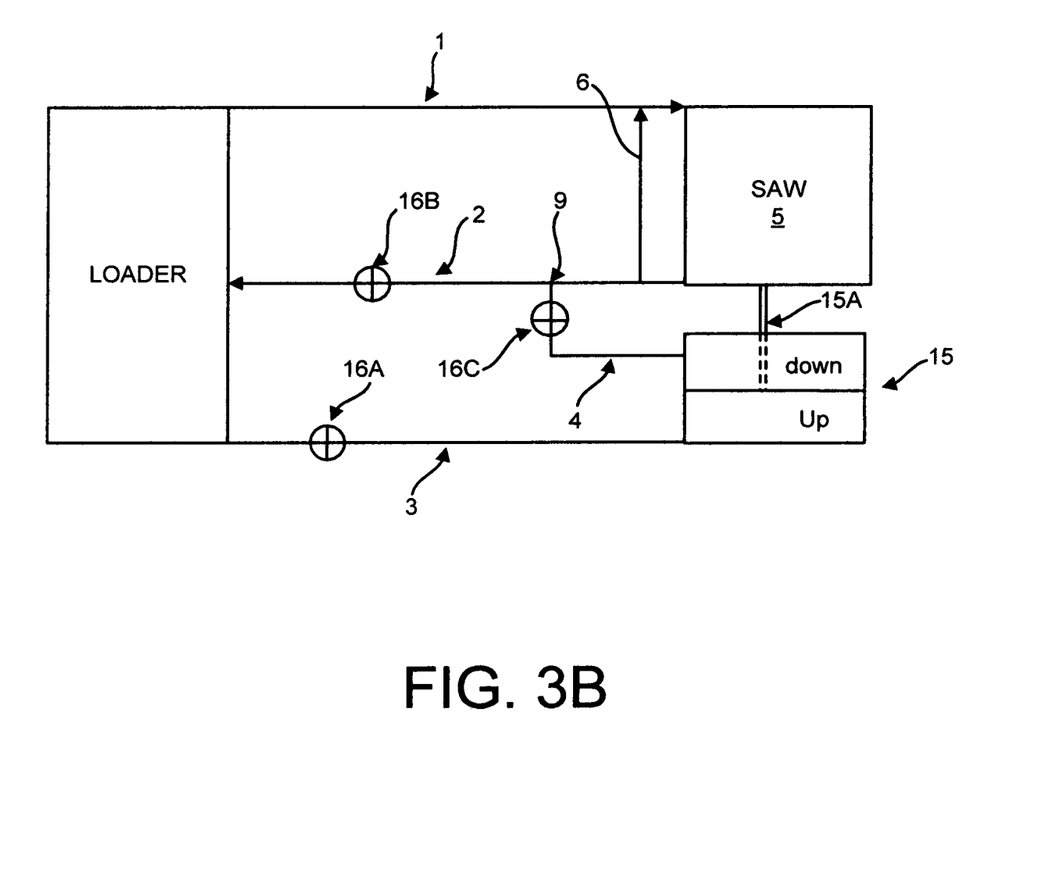
FIG. 3B provides a schematic diagram illustrating the overall arrangement of hydraulic power lines and other features of the invention.

As can be discerned from the previous discussion, back pressure created by strategically placed flow restricting orifices or flow controls 16A, 16B, 16C is critical to the function of our invention. (See, generally, FIGS. 3A-3B). It will, therefore, be appropriate to reiterate certain features and points. First, on the 1" return line 2, the orifice or flow control 16B can be placed anywhere between the "T" junction 9 and the loader itself. The restriction it creates in fluid flow creates back pressure, forcing the hydraulic fluid to go through line 4, making the saw 10 go down. (Recirculation line 6 and check valve 7 keeps the hydraulic fluid circulating for the longevity of the motor 5 and assist in keeping saw 5 rotating at high speed despite partial blockage of fluid flow by flow control 16B). Second, the flow restricting orifice or flow control 16A in line 3 between the hydraulic cylinder 15 and the loader makes the saw 5 come back into the pocket 13 smoothly. Third, in line 4 there is a restricting orifice or flow control 16C between the "T" junction 9 and the hydraulic cylinder 15. This makes the saw 5 go down at the right speed to cut through the wood being sawed. These flow restricting orifices or flow controls 16A, 16B, 16C make the entire process and apparatus work as described by virtue of their slowing of hydraulic fluid flow in the locations named.

In terms of actual operator activation and use, the power supplied through the first button (sending fluid into cylinder 15 to raise the saw 5) is only present when the first button/switch is being pushed. Consequently, when it is released and the second button is pushed to bring saw 5 up to speed, backpressure builds through lines 2 and 4 and pushes fluid into the down side of hydraulic cylinder 15 (bringing the saw 5 down for sawing purposes). Hydraulic fluid can be evacuated from the raise side of cylinder 15 as fluid pressure builds in the raise side of the cylinder 15 and fluid power is no longer being supplied via line 3 to this side of the hydraulic cylinder. The opposite happens when the first button is pushed and the second button is no longer being pushed.

Figure 4A:
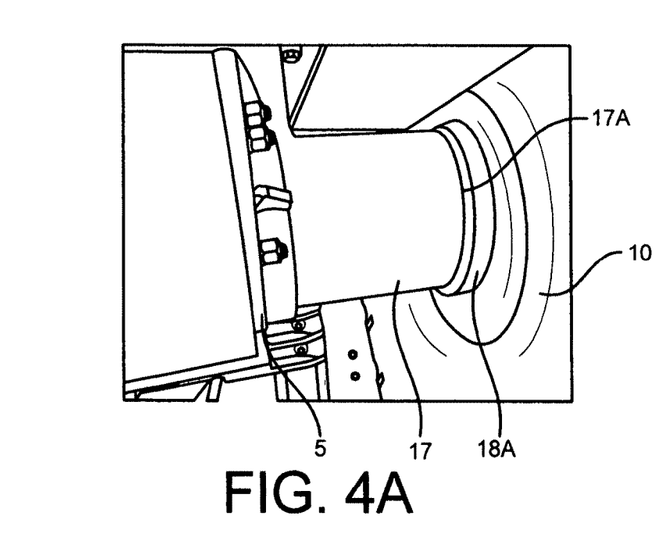
FIG. 4A provides a perspective view of the "back-side" of the saw of the invention, illustrating the mandrel assembly serving as an interface between the motor and saw.
Figure 4B:
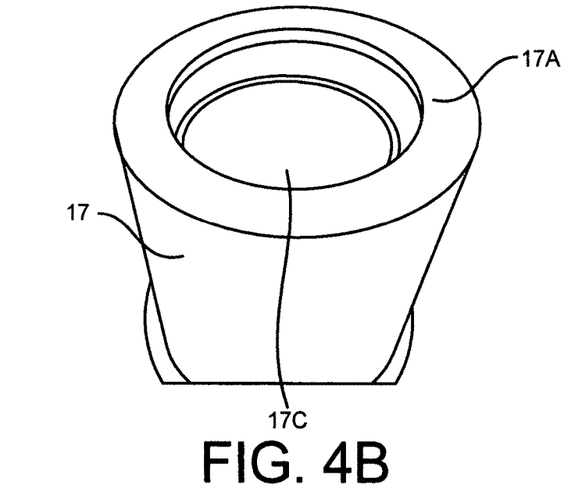
FIG. 4B provides a perspective view of an end of the mandrel housing used in the invention.
Figure 4C:
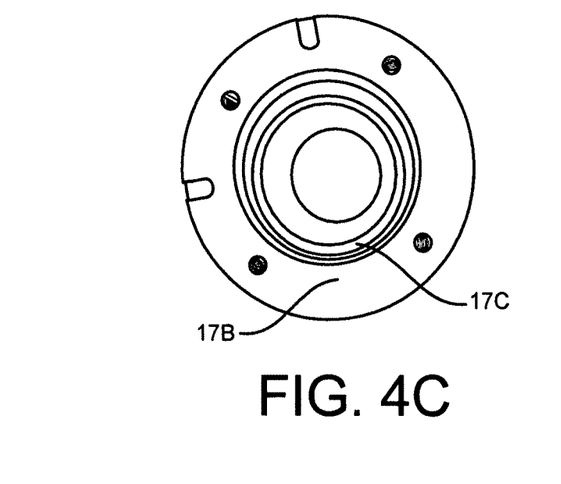
FIG. 4C provides a perspective view of an other end of the mandrel housing used in the invention.
Figure 4D:
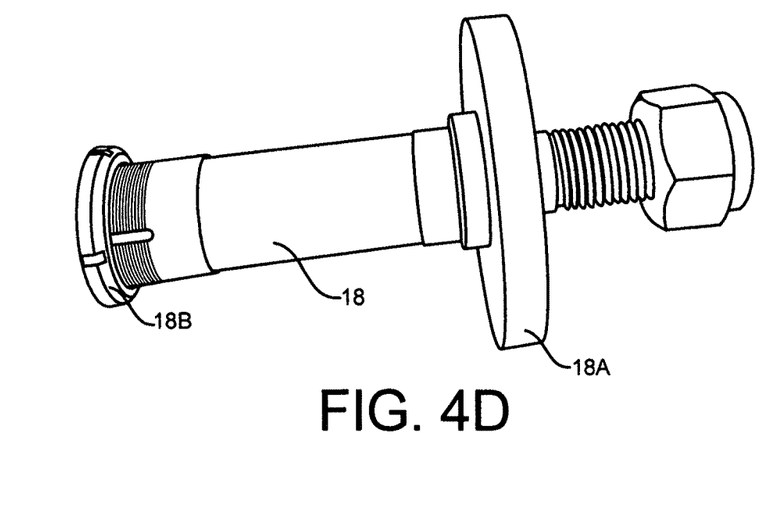
FIG. 4D provides a perspective view of the mandrel shaft used in the invention.
Figure 4E:
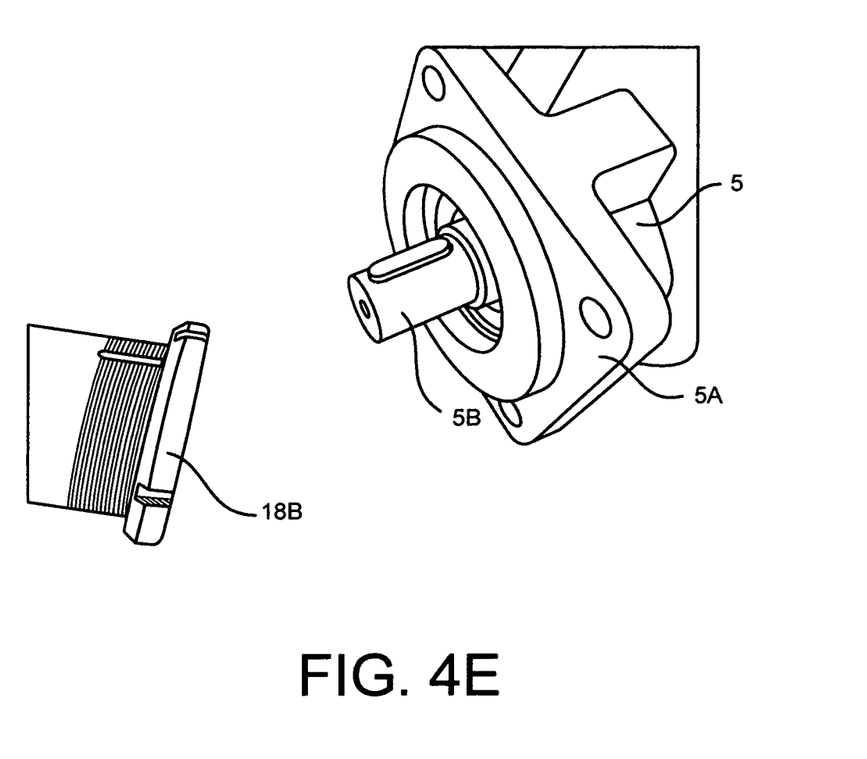
FIG. 4E provides a perspective view of an end portion of the mandrel shaft that interfaces with the saw motor of the invention and interfacing end portion of the saw motor of the invention.

FIGS. 4A through 4E provide illustrations of a mandrel housing 17 and shaft 18 assembly advantageously used in and with the circular saw assembly of our invention. Turning first to FIG. 4A, it will be seen that the mandrel housing 17 is affixed intermediate the saw motor 5 and saw 10. As best seen by review of FIGS. 4A, 4B, 4C and 4E, saw facing end 17A of mandrel housing 17 is proximate saw 10, while an interface flange 17B at the opposite end of mandrel housing 17 is provided with bolt holes to interface with, and be bolted to, matching bolt holes of saw motor flange 5A. Mandrel shaft 18 seats within mandrel housing 17 interior 17C with its saw interface 18A connected to saw 10, and its motor interface 18B connected to motor 5 drive shaft 5B. Bearings (not shown) are intermediate the sides of shaft 18 and the interior 17C of housing 17 to allow shaft 18 with its connected saw 10 to be freely rotatable when driven by motor 5 in accordance with the mechanical arts.

PARTS LIST 1 saw power hose/line running from loader to saw motor
2 saw return hose/line running from saw motor to loader
3 saw raise hose/line running from loader to hydraulic cylinder
4 saw lower hose/line running from "T" junction in line 2 in my invention rather than from the loader as in prior art
5 saw motor
5B motor drive shaft
6 recirculation line between motor input via line 1 and motor output line 2
7 check valve in recirculation line permitting only flow from output to input side of motor
8 cradle or trough
9 "T" junction
10 circular saw blade
11 pivot for circular saw
12 frame for circular saw assembly
13 "pocket" (location of circular saw in lifted position
14A frame upright defining pocket
14B frame upright defining pocket
15 hydraulic cylinder for raising/lowering circular saw
15A piston arm connecting hydraulic cylinder to circular saw assembly
16A Restricting orifice or flow control in line 3 hydraulic cylinder and loader
16B Restricting orifice or flow control in line 2 between between "T" and loader
16C Restricting orifice flow control in line 4 between between "T" and hydraulic cylinder
17 Mandrel housing
17A Mandrel (saw facing end)
17B Mandrel (motor interface flange)
17C Mandrel housing interior
18 mandrel shaft
18A Mandrel shaft (saw interface)
18B Mandrel shaft (motor interface)

In view of the foregoing, it should be clear that numerous changes and variations can be made without exceeding the scope of the inventive concept outlined. Accordingly, it is to be understood that the embodiment(s) of the invention herein described is/are merely illustrative of the application of the principles of the invention. Reference herein to details of the illustrated embodiment(s) is not intended to limit the scope of the claims when filed, which will recite those features regarded as essential to the invention.

The invention claimed is:

1. A hydraulically powered slasher saw system adapted for a connection by hydraulic lines to a source of hydraulic power, comprising:
    a circular saw blade actuated by a saw blade motor, which the circular saw blade is raised in order to position a load of wood for cutting and lowered to cut through said load of wood;
    a first hydraulic fluid input line conveying hydraulic fluid from between said source of hydraulic power to a fluid input for the saw blade motor for powering said saw blade motor;
    a second hydraulic fluid output line conveying hydraulic fluid from a fluid output of said saw blade motor and back to said source of hydraulic power for recirculating hydraulic fluid from said saw blade motor to said source of hydraulic power;
    a third hydraulic fluid line conveying hydraulic fluid between said source of hydraulic power and a mechanism for raising the circular saw blade by conveying hydraulic fluid input from said source of hydraulic power and for lowering the circular saw blade by releasing hydraulic fluid output from said mechanism; and
    a fourth hydraulic fluid line connected by a "T" juncture to said second hydraulic fluid output line and running between said "T" juncture and the mechanism for lowering said saw blade via hydraulic fluid input from said second hydraulic fluid output line: and
    a fifth hydraulic fluid line, comprising a one-way fluid valve receiving hydraulic fluid from the fluid output of the saw blade motor prior to the "T" juncture in the second hydraulic fluid line, and conveying said hydraulic fluid to the first hydraulic fluid input line for the saw blade motor, and wherein said one-way fluid valve allows hydraulic fluid to flow only from the hydraulic fluid output of the saw blade motor to the hydraulic fluid input for said saw blade motor.

2. The slasher saw system of claim 1, wherein at least one of:
    the mechanism for raising the saw blade is a hydraulic cylinder receiving fluid via said first hydraulic fluid line,
    the mechanism for lowering the saw blade is a hydraulic cylinder receiving fluid via said second hydraulic fluid line,
    the mechanism for raising the saw blade is one side of a hydraulic cylinder receiving fluid via said first hydraulic fluid line and the mechanism for lowering the saw blade is an other side of said hydraulic cylinder receiving fluid via said second hydraulic fluid line, and
    the saw blade is a circular saw blade and is mounted to the motor by a mandrel so as to continue freely rotating in its direction of motion even when said motor is not being actuated by fluid received via said first hydraulic fluid line.

3. The slasher saw system of claim 2, wherein said third hydraulic fluid line is not connected to said second hydraulic fluid line outside of the loader.

4. The slasher saw system of claim 1, further comprising a fluid flow restriction in the second hydraulic fluid line intermediate between the source for hydraulic power and said "T" juncture, which said fluid flow restriction creates back pressure forcing fluid through the fourth hydraulic fluid line via said "T" juncture to the mechanism for lowering said saw blade.

5. The slasher saw system of claim 2, further comprising a fluid flow restriction in the second hydraulic fluid line intermediate between the source for hydraulic power and said "T" juncture, which said fluid flow restriction creates back pressure forcing fluid through the fourth hydraulic fluid line via said "T" juncture to the mechanism for lowering said saw blade.

6. The slasher saw system of claim 5, further comprising at least one of:
- a fluid flow restriction in the third hydraulic fluid line, which said fluid flow restriction regulates and slows the speed of fluid flow into said mechanism for raising said saw blade so as to cause said saw blade to be raised at a slower pace, and
- a fluid flow restriction in the fourth hydraulic fluid line intermediate said "T" juncture and said mechanism for lowering said saw blade, which said fluid flow restriction regulates and slows the speed of fluid flow into said mechanism for lowering said saw blade so as to cause said saw blade to be lowered at a slower pace.

7. The slasher saw system of claim 6, wherein said third hydraulic fluid line is not connected to said second hydraulic fluid line outside of the loader.

8. The slasher saw system of claim 5, wherein said third hydraulic fluid line is not connected to said second hydraulic fluid line outside of the loader.

9. The slasher saw system of claim 4, further comprising at least one of:
- a fluid flow restriction in the third hydraulic fluid line, which said fluid flow restriction regulates and slows the speed of fluid flow into said mechanism for raising said saw blade so as to cause said saw blade to be raised at a slower pace, and
- a fluid flow restriction in the fourth hydraulic fluid line intermediate said "T" juncture and said mechanism for lowering said saw blade, which said fluid flow restriction regulates and slows the speed of fluid flow into said mechanism for lowering said saw blade so as to cause said saw blade to be lowered at a slower pace.

10. The slasher saw system of claim 9, wherein said third hydraulic fluid line is not connected to said second hydraulic fluid line outside of the loader.

11. The slasher saw system of claim 4, wherein said third hydraulic fluid line is not connected to said second hydraulic fluid line outside of the loader.

12. The slasher saw system of claim 1, further comprising at least one of:
- a fluid flow restriction in the third hydraulic fluid line, which said fluid flow restriction regulates and slows the speed of fluid flow into said mechanism for raising said saw blade so as to cause said saw blade to be raised at a slower pace, and
- a fluid flow restriction in the fourth hydraulic fluid line intermediate said "T" juncture and said mechanism for lowering said saw blade, which said fluid flow restriction regulates and slows the speed of fluid flow into said mechanism for lowering said saw blade so as to cause said saw blade to be lowered at a slower pace.

13. The slasher saw system of claim 2, further comprising at least one of:
- a fluid flow restriction in the third hydraulic fluid line, which said fluid flow restriction regulates and slows the speed of fluid flow into said mechanism for raising said saw blade so as to cause said saw blade to be raised at a slower pace, and
- a fluid flow restriction in the fourth hydraulic fluid line intermediate said "T" juncture and said mechanism for lowering said saw blade, which said fluid flow restriction regulates and slows the speed of fluid flow into said mechanism for lowering said saw blade so as to cause said saw blade to be lowered at a slower pace.

14. The slasher saw system of claim 13, wherein said third hydraulic fluid line is not connected to said second hydraulic fluid line outside of the loader.

15. The slasher saw system of claim 12, wherein said third hydraulic fluid line is not connected to said second hydraulic fluid line outside of the loader.

16. The slasher saw system of claim 1, wherein said third hydraulic fluid line is not connected to said second hydraulic fluid line outside of the loader.

* * * * *